Patented June 20, 1933

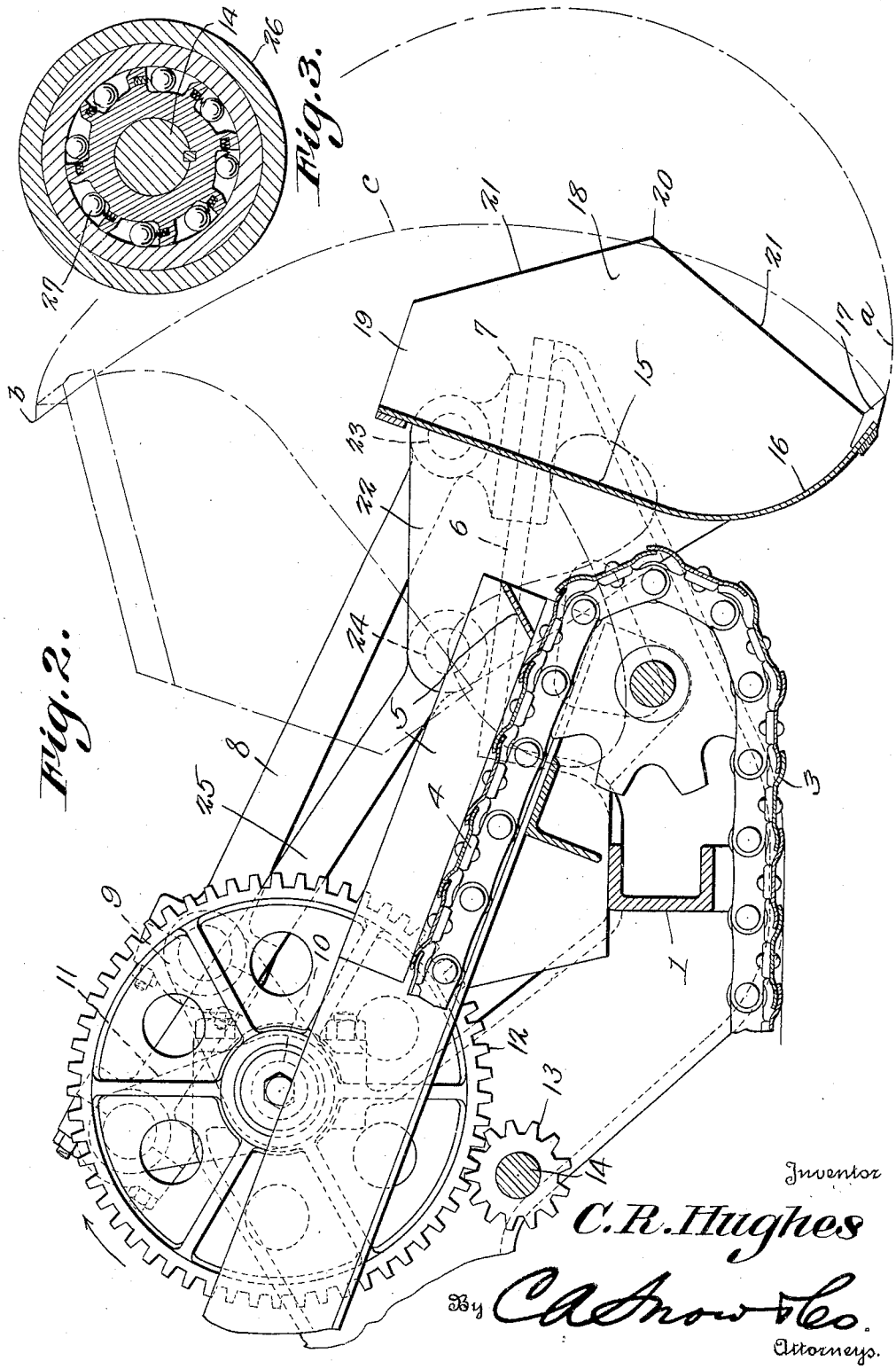

1,915,021

UNITED STATES PATENT OFFICE

CHARLES R. HUGHES, OF ALTOONA, PENNSYLVANIA

LOADING MACHINE

Application filed January 29, 1932. Serial No. 589,699.

This invention relates to a machine designed primarily for loading coal or other materials onto a conveyor. It is more especially intended to be used in mines but its application may be extended to include the handling of materials wherever located.

One of the objects of the invention is to provide a scoop having a simplified means for forcing it into a pile of bulk material and then swinging it upwardly and rearwardly so as to elevate the load and deposit it rearwardly by gravity onto a conveyor provided therefor.

A further object is to impart a compound right line and oscillating motion to the scoop or shovel from a single shaft, the connecting means being such as to insure the correct cycle of movement of the scoop or shovel.

A still further object is to provide an operating mechanism for the scoop or shovel whereby, after the load has been elevated and discharged, the scoop or shovel will be free to drop by gravity to its initial or starting point, this return movement being independent of the operating means.

With the foregoing and other objects in view which will appear as the description proceeds, the invention resides in the combination and arrangement of parts and in the details of construction hereinafter described and claimed it being understood that changes in the precise embodiment of the invention herein disclosed may be made within the scope of what is claimed without departing from the spirit of the invention.

In the accompanying drawings the preferred form of the invention has been shown.

In said drawings:

Figure 2 is a section on line 2—2, Figure 1, the unloading position of the scoop or shovel being indicated by broken lines, and the loading position being indicated by full lines, while the path of movement of the advancing edge of the shovel or scoop has also been indicated.

Figure 3 is a section through the clutch connection between the drive gear and its shaft.

Figure 1:
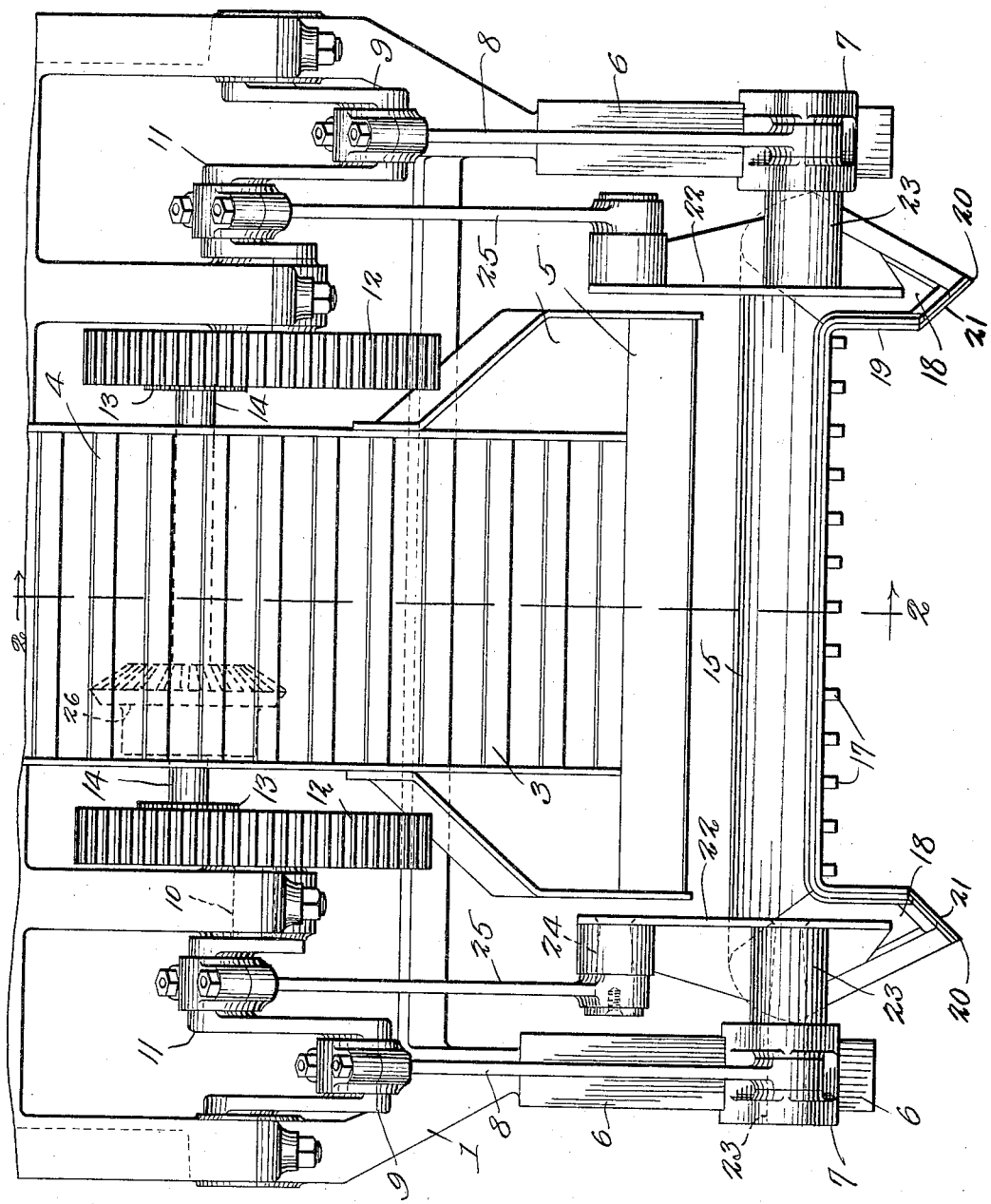
Figure 1 is a plan view of one end portion of a loading machine provided with the present improvements.

Referring to the figures by characters of reference 1 designates a portion of the frame of a loading machine. This can be constructed in any manner desired and can be moved by any preferred mechanism provided for that purpose. As this mechanism and the construction of the frame constitute no part of the present invention it has not been deemed necessary to illustrate or describe the same. Furthermore, an endless conveyor, a portion of which has been shown at 3, can be carried by the frame and operated by any suitable mechanism, this conveyor being located where the upwardly and rearwardly extended portion 4 can receive bulk material as it is delivered from the scoop or shovel hereinafter referred to. It is preferred to provide a hopper-like portion 5 above the lower portion of the conveyor into which the bulk material can be delivered.

Parallel guide rails 6 are extended forwardly from the side portions of the machine and mounted on each of these rails is a slide 7. Each of these slides is connected by a connecting bar 8 to a crank 9 carried by a shaft 10. Two of these shafts are provided. They are disposed for rotation about a common center and the conveyor is extended between them. Another crank 11 is carried by each of the shafts 10 and is disposed at a suitable angle relative to crank 9. Each shaft 10 has a gear 12 secured to the inner end thereof and the two gears are in constant mesh with smaller gears 13 secured to a transverse shaft 14. Thus the two shafts are held against independent rotation and in practice the cranks 9 are disposed in transverse alinement with each other while the same is true of the two cranks 11.

The scoop or shovel includes a flat bottom plate 15 which merges at one end into a curved portion 16 along the front edge of which is arranged a row of bits 17 for plowing into the bulk material to be removed. The scoop or shovel has side plates 18 which converge away from the bits 17. Thus a restricted opening or mouth 19 is provided between the side plates 18 at that end of the scoop or shovel remote from the bits. Each side plate is also preferably of greater width adjacent to its center than at other points, as indicated at 20, the edges 21 of these plates diverging from the points 20 toward the bits 17 and the mouth 19, as shown particularly in Figure 2.

Secured to and extending from the side plates 18 toward shafts 10 are side wings 22 each of which has a laterally extended gudgeon 23 journaled in the adjacent slide 7 so that the two slides will thus support the scoop or shovel for both sliding and oscillating motion. The gudgeons are preferably located beyond the sides of plate 15 and adjacent to the mouth 19. Extended laterally from the free end portion of each wing 22 is a stud 24 engaged by a connecting bar 25 which is mounted on the adjacent crank 11.

Shaft 14 is actuated directly by a gear 26 shown in Figures 1 and 3. This gear has built into the body thereof an overrunning clutch device, 27. The effect of this is to permit positive drive of shaft 14 in one direction only. A reversal of the direction of the gear will free the clutch so that no motion will be imparted to shaft 14. One other effect which is of outstanding importance is that shaft 14 may be rotated at a speed higher than the angular rotation of the gear when they are both rotating in the direction of positive drive.

It is to be understood that motion can be imparted to gear 26 from any source. As the shafts 10 rotate in unison their cranks will also operate in unison.

The term "overrunning clutch device" used herein and in the claims is to be construed as of such scope as to cover not only the form of clutch shown but also a pawl and ratchet connection or other means whereby the described operation can be effected.

Assuming that the scoop or shovel is in an intermediate position, as shown by full lines in Figure 2, it will be understood that when the cranks move in a clockwise direction, as indicated by the arrow in Figure 2, the cranks 9, being in advance of the cranks 11 will impart only a slight additional forward movement to the slides 7 and the scoop or shovel. During this slight forward movement the cranks 11 will swing from the position shown in Figure 2 forwardly and downwardly toward a dead center. Thus the connecting bars 25 will thrust downwardly and forwardly onto the studs 24 and wings 22 and cause the advancing lower edge of the scoop or shovel to swing forwardly and upwardly from position $a$ in Figure 2 to position $b$ in said figure. As the scoop or shovel is thus being elevated about the axis of gudgeons 23 the cranks 9 have moved downwardly past their dead centers and continued rearwardly, thereby pulling through connecting bars 8 to draw the slides 7 backwardly. Consequently the scoop or shovel will be brought to an inclined position indicated by broken lines in Figure 2 with its mouth 19 opening downwardly into hopper 5. Following the delivery of material from the scoop or shovel into the hopper the cycle of movement will continue and as the bit end of the scoop or shovel leaves point $b$ the weight of the bucket will cause the bucket to drop along the path $c$ back into its initial position $a$.

This operation is permitted by the overrunning clutch 27 which frees all rotating parts from back resistance and allows the scoop or shovel to gravitate quickly.

Importance is attached to the fact that compound right line and oscillating movement of the scoop or shovel is produced by connections with a single shaft. This results in the simplification of the structure and consequent increase in strength, reduction of cost, and elimination of practically all danger of breakage which has heretofore been present where complicated mechanism has been required.

It is to be understood that eccentrics or other suitable elements could be used in lieu of the cranks 9 and 11 and the term "cranks" as used in the claims is to be construed as sufficiently broad to cover all devices which might be used in lieu of cranks provided they rotate about a common axis.

What is claimed is:

1. In a loading machine parallel rails, slides thereon, a scoop pivotally mounted on the slides and having a material receiving end and a delivery end, operating means rotatable about a common axis, and including cranks spaced angularly about their axis of rotation, and separate connecting members attached to the scoop at the axis of its pivot and at a point remote from said axis, respectively, said members being engaged and actuated by the respective cranks, thereby to advance the slides and scoop while in material receiving position, swing it upwardly and rearwardly to position with its delivery end lowermost, and return the slides and scoop to receiving position along lines extending beneath the axis of the cranks.

2. In a loading machine guides, slides thereon, a scoop between and pivotally supported by the slides, said scoop having a material receiving end and converging to a material delivering end, wings extending from the scoop, and means for advancing the scoop while in material receiving position, swinging it upwardly and rearwardly to position with its delivery end lowermost, and then returning it to receiving position, said means including cranks arranged in pairs and rotatable about a common axis located above the plane of the guides, the cranks of one pair being in advance of the cranks of the other pair when rotating in one direction, rods constituting direct connections between the cranks of one pair and the slides, and rods constituting direct connections between the remaining cranks and the wings.

3. In a loading machine guides, slides thereon, a scoop between and pivotally supported by the slides, said scoop having a material receiving end and converging to a material delivering end, wings extending from the scoop, cranks rotatable about a common axis, one being in advance of the other when rotating in one direction, a rod constituting a direct connection between one crank and a slide, and a rod constituting a direct connection between the other crank and a wing and means for guiding the slides along lines extending beneath the axis of the cranks.

4. In a loading machine guides, slides thereon, a scoop between and pivotally supported by the slides, said scoop having a material receiving end and converging to a material delivering end, wings extending from the scoop, and means for advancing the scoop while in material receiving position, swinging it upwardly and rearwardly to position with its delivery end lowermost, and then returning it to receiving position, said means including cranks arranged in pairs and rotatable about a common axis located above the plane of the guides, the cranks of one pair being in advance of the cranks of the other pair when rotating in one direction, rods constituting direct connections between the cranks of one pair and the slides, and rods constituting direct connections between the remaining cranks and the wings and mechanism for rotating the cranks including a shaft rotatable continuously in one direction, rotatable driving connections between the shaft and cranks, a power receiving gear on the shaft, and an overrunning clutch connection between said gear and shaft for rotating the cranks during a portion of the rotation of the shaft to elevate the scoop and for releasing the scoop for return by gravity to its point of starting during the remainder of the rotation of the shaft thereby to rotate said mechanism in advance of the shaft without change of direction.

In testimony that I claim the foregoing as my own, I have hereto affixed my signature.

CHARLES R. HUGHES.